United States Patent
Hunting, Sr.

(10) Patent No.: US 9,333,894 B1
(45) Date of Patent: May 10, 2016

(54) TRUCK BED PROTECTOR

(71) Applicant: Robert L. Hunting, Sr., Elk Grove, CA (US)

(72) Inventor: Robert L. Hunting, Sr., Elk Grove, CA (US)

( * ) Notice: Subject to any disclaimer, the term of this patent is extended or adjusted under 35 U.S.C. 154(b) by 0 days.

(21) Appl. No.: 14/722,598

(22) Filed: May 27, 2015

Related U.S. Application Data

(60) Provisional application No. 62/038,555, filed on Aug. 18, 2014.

(51) Int. Cl.
| | |
|---|---|
| *B60P 7/04* | (2006.01) |
| *B60J 11/02* | (2006.01) |
| *B60J 7/08* | (2006.01) |
| *B60R 13/00* | (2006.01) |
| *B60J 11/06* | (2006.01) |

(52) U.S. Cl.
CPC .. *B60P 7/04* (2013.01); *B60J 7/085* (2013.01); *B60J 11/025* (2013.01); *B60J 11/06* (2013.01); *B60R 13/00* (2013.01)

(58) Field of Classification Search
CPC .............. B60J 7/085; B60J 7/10; B60J 7/102; B60J 11/02; B60J 11/025; B60J 11/06; B60P 7/04; B60R 13/01
USPC ........... 296/39.2, 98, 100.01, 100.11, 100.16, 296/136.01, 136.03, 136.1
See application file for complete search history.

(56) References Cited

U.S. PATENT DOCUMENTS

| | | | |
|---|---|---|---|
| 4,997,227 A | 3/1991 | Falzone et al. | |
| 5,400,813 A * | 3/1995 | Swan, Jr. ................ | E04H 15/08 135/119 |
| 5,542,733 A | 8/1996 | Kintz | |
| 5,636,883 A | 6/1997 | Johns | |
| 5,788,307 A | 8/1998 | Gilbert | |
| 5,944,375 A | 8/1999 | Schenk et al. | |
| 6,073,964 A | 6/2000 | Smith | |
| 6,106,050 A | 8/2000 | McLeod | |
| 6,296,279 B1 | 10/2001 | Stoddard et al. | |
| 6,783,169 B1 | 8/2004 | Marx et al. | |
| 7,695,047 B2 * | 4/2010 | Kohlstrand ............. | B60J 7/067 296/100.01 |
| 2002/0005654 A1 * | 1/2002 | Kolper ..................... | B60P 7/04 296/136.1 |
| 2002/0038962 A1 * | 4/2002 | Perez ..................... | B60J 7/102 296/136.07 |

FOREIGN PATENT DOCUMENTS

GB       1114344 A  *  5/1968   ............... B60J 11/02

* cited by examiner

*Primary Examiner* — Jason S Daniels
(74) *Attorney, Agent, or Firm* — Robert C. Montgomery; Montomery Patent and Design LLC

(57) ABSTRACT

A truck bed protector utilizes protective coverings and attachment brackets enabling installation within a truck bed. The protective coverings can be arranged in a variety of ways in order to protect either the inside of the truck or the outside. Further, with use of tent posts, the protective coverings can be used as a tent or as protection from the sun. The protective coverings can also be joined to cover cargo or be used for advertising purposes when covering the outside of the truck.

14 Claims, 4 Drawing Sheets

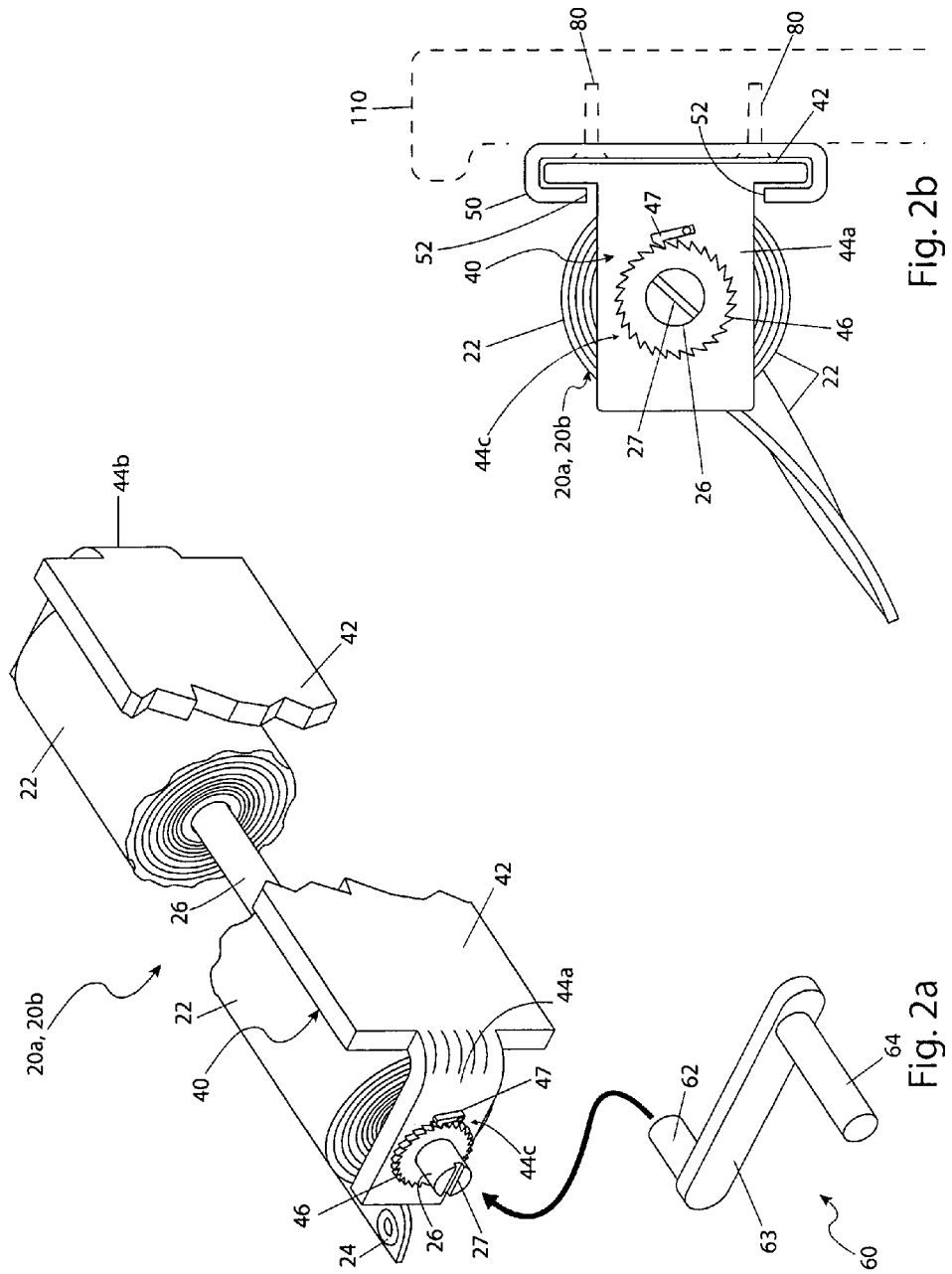

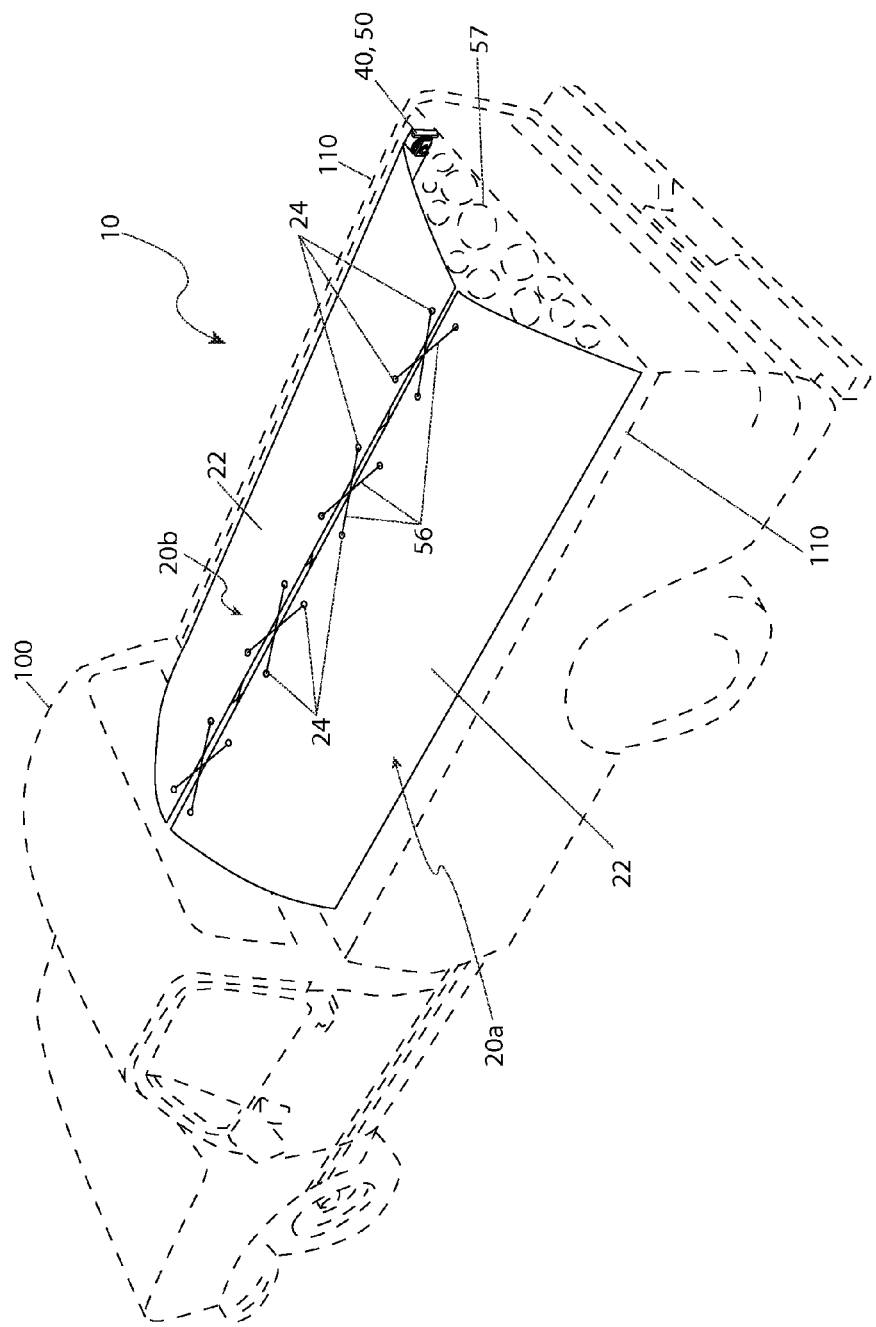

TRUCK BED PROTECTOR

RELATED APPLICATIONS

The present invention was first described in and claims the benefit of U.S. Provisional Application No. 62/038,555, filed Aug. 18, 2014, the entire disclosures of which are incorporated herein by reference.

FIELD OF THE INVENTION

The present invention relates generally to a protective covering that can be arranged in a variety of ways in order to protect either the inside or the outside of the truck.

BACKGROUND OF THE INVENTION

With sales at an all-time high, the popularity of the pickup style truck as an everyday vehicle is more widespread ever. The pickup truck's utility and convenience in hauling items coupled with the availability of luxury interiors and extended cab space have made the pickup a popular alternative to other vehicles. The widespread availability of aftermarket accessories also enhances the attractiveness of pickup trucks. Perhaps one (1) of the most common accessories is that of a truck bed cap. Such an accessory both covers and protects the contents of the bed area from weather elements and theft. While a truck bed cap provides a significant amount of added value, there are still occasions when the functionality of an open bed pickup truck is needed. When an open bed pickup truck is needed oftentimes the bed will be fitted with a bed cover.

However, bed covers are not without drawbacks. For instance, the pickup truck bed cover does little to nothing to protect the sides of the pickup truck. Also, there are times when the volume of the pickup truck bed is inadequate to carry the desired load even though the truck's weight limit has not been exceeded. When truck bed volume is an issue it often presents when the pickup truck will be used for carrying loads such as leaves, grass clippings or mulch. While it may be a personal irritant to have a portion of the truck's load blow out of the truck while in transit under many circumstances such load transportation is also against state law. Depending on the circumstance, a person operating a vehicle with an unsecured load may be subject to civil and criminal penalties for anything from littering to creating a hazardous travel condition. Accordingly, there exists a need for a means by which a pickup truck bed cover can be modified to address these concerns. The use of the truck bed protector provides for multiple modes of protection for the bed area and load securing of a given pickup truck in a manner that is quick, easy and effective.

SUMMARY OF THE INVENTION

The inventor has recognized the aforementioned issues and inherent problems and observed that there is a need for a truck bed protector.

It is therefore an object of the invention to provide a truck bed liner comprising a frame assembly capable of being removably attached to an interior side of a bed of a truck via at least a pair of brackets. There is a textile panel which has a proximal end mounted to the frame assembly and an opposing distal edge. The textile panel is disposed in a rolled configuration when not deployed and is selectively deployed to cover the bed of the truck or an exterior side of the bed of the truck.

The liner may also comprise of at least one pole. The distal edge of the textile panel may also comprise at least a pair of grommets. Each pole has a first end configured to be inserted into an individual grommet and a second end configured to be inserted into or onto a surface. Each pole is also configured to support the distal edge of the textile panel at an elevated position above the surface.

The frame assembly also comprises a planar portion which has a pair of distal ends each slidably engaging and securable to each of the pair of brackets, a pair of end plates, each perpendicularly extending away from the pair of brackets and located at the pair of distal ends and a spindle which has a drive slot on a first end. The spindle is rotatingly attached to and spans a distance between the pair of end plates and receives the proximal end of the textile panel.

The frame assembly also comprises a ratchet gear attached to the first end of the spindle adjacent to the drive slot and a pawl attached to one (1) of the pair of end plates adjacent to the ratchet gear and in mechanical communication with the same. The ratchet gear and the pawl provide for rotational control of the spindle and the rotational control operates to permit or arrest deployment of the textile panel.

The frame assembly also comprises a windup tool capable of engaging the drive slot to selectively wind the textile panel about an axis of the spindle. Additionally, the frame assembly also comprises a windup tool capable of engaging the drive slot to selectively unwind the textile panel away from the axis of the spindle.

The liner may also comprise a first frame assembly capable of being removably attached to a first interior side of a bed of a truck via at least a first pair of brackets and a second frame assembly capable of being removably attached to a second interior side of a bed of a truck opposite the first interior side via at least a second pair of brackets. The first textile panel has a proximal end mounted to the first frame assembly and an opposing first distal edge. The second textile panel has a second proximal end mounted to the second frame assembly and an opposing second distal edge. There is also a cord, at least one pole. The first and second textile panels are disposed in a rolled configuration when not deployed. The first textile panel is selectively deployed to cover the bed of the truck or a first exterior side of the bed of the truck. The second textile panel is selectively deployed to cover the bed of the truck or a second exterior side of the bed of the truck.

The first and second frame assemblies each further comprise a planar portion, having a pair of distal ends each slidably engaging and securable to each of the respective first or second pair of brackets. Each pair of end plates perpendicularly extend away from the respective first or second pair of brackets and are located at the pair of distal ends and a spindle which has a drive slot on a first end. The spindle is rotatingly attached to and spans a distance between the pair of end plates. The spindle is capable of receiving the first proximal end of the first textile panel or the second proximal end of the second textile panel.

The first and second frame assemblies further comprise a ratchet gear attached to the first end of the spindle which is adjacent the drive slot and a pawl attached to one (1) of the pair of end plates adjacent to the ratchet gear and in mechanical communication with the same. The ratchet gear and pawl provide for rotational control of the spindle. The rotational control operates to permit or arrest deployment of the first or second textile panel.

The first and second frame assembly further comprises a windup tool capable of engaging the drive slot to selectively wind the first or second textile panel about an axis of the spindle. The first and second frame assembly further comprises a windup tool capable of engaging the drive slot to selectively unwind the first or second textile panel away from the axis of the spindle. The first and second textile panel's distal edge each further comprises at least a pair of grommets disposed adjacent to a perimeter thereto. Each pole has a first end configured to be inserted into an individual grommet and a second end configured to be inserted into or onto a surface. Each pole is configured to support the distal edge of the textile panel at an elevated position above the surface. The cord is capable of being routed through grommets of the first textile panel distal edge and the second textile panel distal edge, when the first and second textile panels are deployed within the bed.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2a is a perspective view of a frame assembly portion 40 of the truck bed liner and signage 10, according to a preferred embodiment of the present invention;

FIG. 2b is a side environmental view of the frame assembly 40, according to a preferred embodiment of the present invention;

Figure 1:
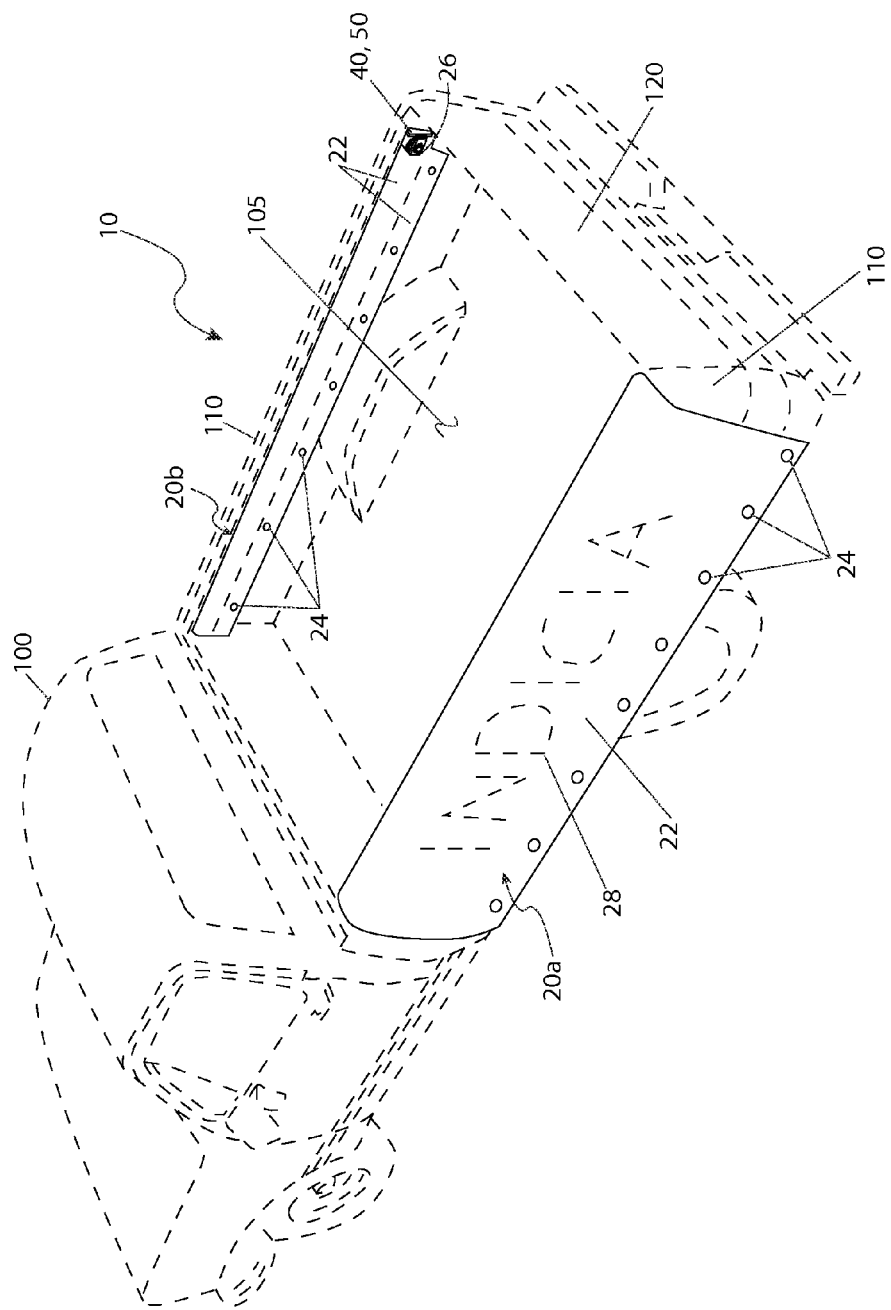
FIG. 1 is an environmental view of a truck bed liner and signage 10 depicting an in-use state, according to a preferred embodiment of the present invention.

DESCRIPTIVE KEY 10 truck bed liner and signage
20a first liner assembly
20b second liner assembly
22 textile panel
24 grommet
26 spindle
27 drive slot
28 indicia
40 frame assembly
42 main plate
44a first end plate
44b second end plate
44c spindle aperture
46 ratchet gear
47 pawl
50 mounting bracket
52 bracket slot
56 cord
57 cargo
60 windup tool
62 socket
63 crank
64 handle
74 pole
75 guy wire
80 fastener
100 truck
105 bed
110 bedside
120 tailgate The best mode for carrying out the invention is presented in terms of its preferred embodiment, herein depicted within FIGS. 1 through 3b. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a truck bed liner and signage (herein described as the "apparatus") 10, which provides a protective covering system for bed 105 and bedside 110 areas of a truck 100 as well as providing multiple uses. The apparatus 10 includes a pair of rectangular textile panel portions 22 removably attached to opposing interior sides of bedside portions 110 of the truck 100, being mounted thereto using frame assembly 40 and channel-shaped mounting brackets 50. The textile panels 22 may be used to protect bed 105 and bedside 110 portions of the truck 100 as well as meet in the middle of the truck bed 105 to cover and protect carried cargo 57.

Figure 3A:
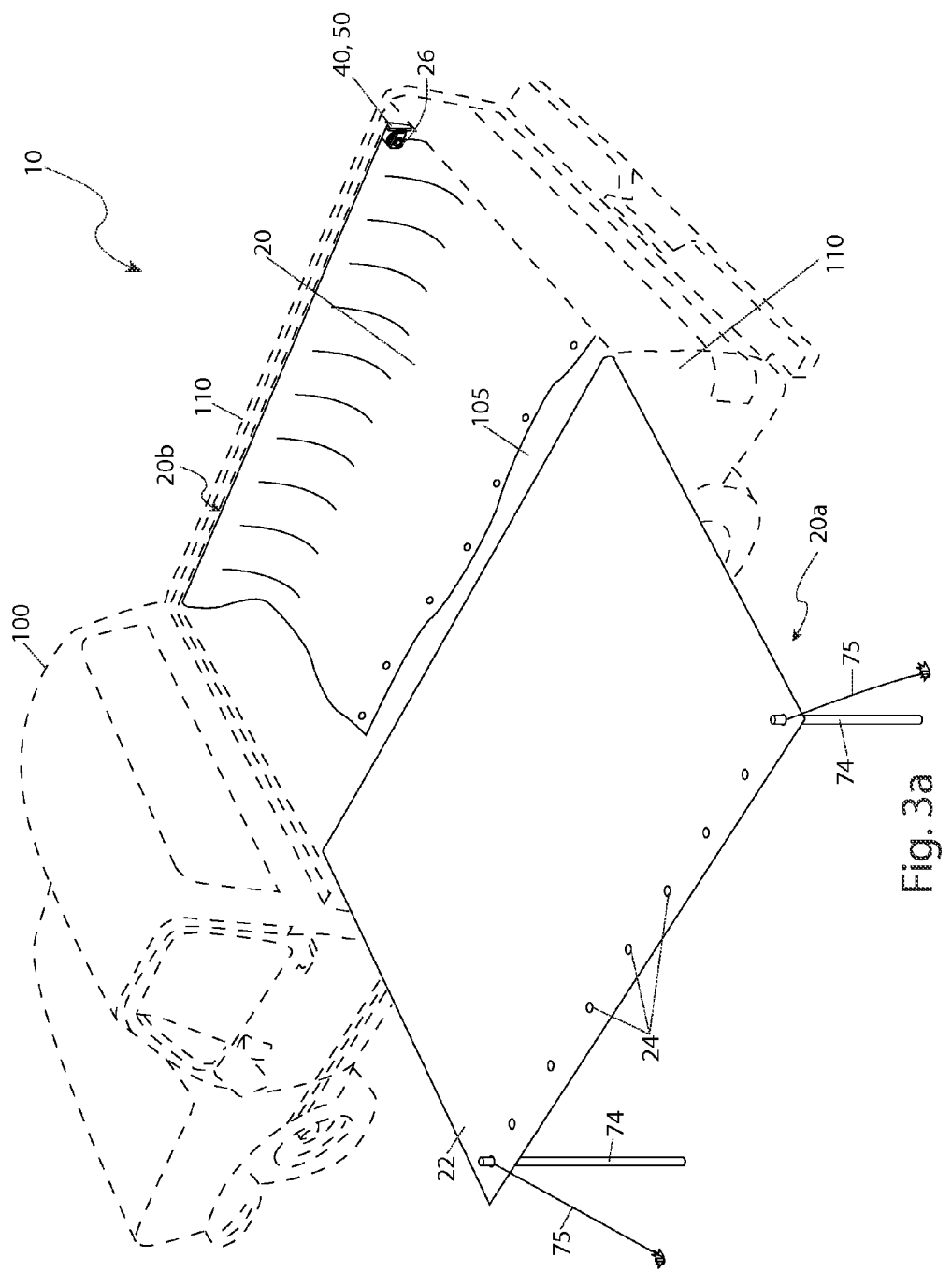
FIG. 3a is an environmental view of the truck bed liner and signage 10 depicting tent and bed liner applications, according to a preferred embodiment of the present invention; and, FIG. 3b is another environmental view of the truck bed liner and signage 10 depicting a cargo 57 covering application, according to a preferred embodiment of the present invention.

Referring now to FIGS. 1, 3a, and 3b, environmental views of the apparatus 10 depicting in-use states, according to a preferred embodiment of the present invention, are disclosed. The apparatus 10 is shown here mounted to a pickup-type truck 100, having a first liner assembly 20a and a second liner assembly 20b which are removably attached to respective bedside portions 110 of the truck 100 via channel-type brackets 50 (see FIGS. 2a and 2b). The brackets 50 are to be permanently installed upon opposing inner surfaces of the bedside portions 110. The liner assemblies 20a, 20b and brackets 50 are envisioned to be introduced in different lengths to match lengths of standard pickup truck beds 105.

The apparatus 10 may be utilized to perform various useful tasks, and is not limited to the example applications illustrated here, and as such should not be interpreted as a limiting factor of the invention.

The apparatus 10, as illustrated in FIG. 1, may be utilized to provide protection to external surfaces of the bedsides 110 during loading and unloading of cargo 57, as well as protect from damage due to incidental contact against the bedsides 110 by equipment, personnel, building materials, and the like. The textile panels 22 are envisioned being made of a durable and weather-resistant textile materials such as canvas, fiber impregnated vinyl, or the like, and to be introduced having a variety of printed or otherwise applied colors and patterns upon at least one (1) side surface. In this configuration, the apparatus 10 may also be utilized to display signage using various indicia 28 being printed or otherwise applied to the textile panel portions 22. The indicia 28 may provide script or logos based upon a user's preference and may include images such as, but not limited to: personal or corporate advertising, sports names/logos, personal names, symbols, pictures, and the like, to further customize the apparatus 10.

The apparatus 10 is shown in FIG. 3a having a first liner assembly portion 20a being utilized as a sun shading means similar to a tent, having a proximal edge portion being mounted to the bedside 110 of the truck 100, and an extended distal edge portion being supported above a ground surface by inserting pole portions 74 into grommet portions 24 of the textile panel 22 located at corner areas of the distal edge. The poles 74 are then secured upon the ground surface in a vertical manner using guy wires 75. The second liner assembly 20b is shown here having a textile panel portion 22 positioned upon a bed portion 105 of the truck 100 to provide protection of the bed 105 from cargo 57 or abrasive materials such as stone, gravel, or the like.

The apparatus 10 is shown in FIG. 3b utilizing the textile panel portions 22 of respective first 20a and second 20b liner assemblies to cover a load of cargo 57 and joined along adjacent extended edges by routing a length of cord 56, such as rope, through respective grommet portions 24.

Referring now to FIGS. 2a and 2b, perspective and side views of a frame assembly portion 40 of the apparatus 10, according to a preferred embodiment of the present invention, are disclosed. The liner assemblies 20a, 20b are to be exact mirror-images of each other, therefore only the second liner assembly 20b is illustrated in FIGS. 2a and 2b for simplicity sake.

Each liner assembly 20a, 20b provides equipment enabling mounting to the bedsides 110 and for rolling up respective textile panel portions 22 into a compact cylindrical format. The liner assemblies 20a, 20b and respective textile panels 22 may remain affixed to the bedsides 110 for temporary storage, or may be removed from the truck 100 entirely if desired.

Each liner assembly 20a, 20b further includes a spindle 26, a frame assembly 40, a ratchet gear 46, and a windup tool 60. The liner assemblies 20a, 20b are affixed to the bedside portion 110 of the truck 100 using a channel-shaped bracket 50 which slidingly receives the frame assembly 40 within. The frame assembly 40 provides a "U"-shaped structure which rotatingly supports a spindle 26 onto which the textile panel 22 is attached and wound. The frame assembly 40 includes a rectangular main plate 42 which extends the width of the textile panel 22. Each main plate 42 further includes perpendicularly extending first end plate 44a and second end plate 44b portions located at respective opposing ends. The end plates 44a, 44b each include an axially aligned spindle aperture 44c into which the rod-like spindle portion 26 is positioned, thereby allowing the textile panel 22 to be wound into a compact cylindrical form as the spindle 26 is rotated.

The channel-shaped bracket 50 preferably extends the length of each bedside 110 being affixed thereto using a plurality of fasteners 80 such as screws or bolts although shorter embodiments fall under the scope of the invention. The bracket 50 provides an open end portion being sized to slidingly receive the main plate portion 42 of the frame assembly 40 in a removably attached manner. The bracket 50 further includes a bracket slot 52 along an entire inwardly facing side surface which allows the narrow end plate portions 44a, 44b of the frame assembly 40 to extend inwardly toward the bed 105 of the truck 100 to support the spindle 26 and textile panel 22. It is envisioned that either or both of the liner assemblies 20a, 20b may be quickly removed from the truck 100 by lowering a tailgate portion 120 of the truck 100 and slidingly removing the frame assembly 40 from the bracket 50.

The frame assembly 40 provides a means to rotate the spindle 26 and wind up the textile panel 22 via a windup tool 60 which engages a drive slot portion 27 formed in a rearward end of the spindle 26, and a ratchet gear 46 and pawl 47 combination which controls rotation of the spindle 26. The windup tool 60 provides a unitary "Z"-shaped weldment including a socket 62, a crank 63, and a cylindrical handle 64.

The socket portion 62 includes an inner mating male feature which engages the drive slot portion 27 of the spindle 26, allowing a user to rotate the windup tool 60 to gather the textile panel 22 upon the spindle 26. The drive slot portion 27 of the spindle 26 may also be rotated using a screw driver or similar tool if necessary. The spindle 26 includes an integral ratchet gear 46, located adjacent to the drive slot 27, which engages a pawl 47 mounted to the first end plate 44a. The ratchet gear 46 and pawl 47 control extension of the textile panel 22, thereby allowing a user to retain the textile panel 22 in a wound format, or in an extended taut condition when being used to cover cargo 57 (see FIG. 3b).

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 2b.

The method of installing the apparatus 10 may be achieved by performing the following steps: procuring a model of the apparatus 10 having liner assemblies 20a, 20b of a particular length which matches an intended truck 100, and also having a desired color and/or indicia 28 portions; lowering the tailgate portion 120 of the truck 100; installing the brackets 50 upon inwardly-facing surfaces of each bedside portion 110 using a plurality of fasteners 80; inserting the main plate portions 42 of each frame assembly 40 into the channel-shaped brackets 50 until fully engaged, so as to position the ratchet gear 46 and pawl 47 portions at a rearward location; and, closing the tailgate 120. The apparatus 10 is now ready for use.

It is envisioned that either or both of the liner assemblies 20a, 20b may be removed from the truck 100 as desired by lowering a tailgate portion 120 of the truck 100 and slidingly removing the frame assembly 40 from the bracket 50.

Methods for utilizing the apparatus 10 to protect portions of the truck 100 as well as perform a variety of tasks may be achieved as follows: extending and draping one (1) or both of the textile panels 22 over respective external surfaces of the bedsides 110 to provide protection to external surfaces during loading and unloading of cargo, as well as from damage due to incidental contact against the bedsides 110 by equipment, personnel, building materials, and the like; or, draping the textile panels 22 over the bedsides 110 to display signage printed thereon including specific indicia 28, script, or logos based upon a user's preference; or, extending and utilizing one (1) or both of the textile panels 22 outwardly from the truck 100 to act as a tent or sun shading device; supporting the textile panels 22 above the ground by inserting pole portions 74 into grommets 24 located at corner areas; securing the poles 74 to a ground surface using guy wires 75; protecting one's self from direct sunlight or inclement weather by occupying an area under the textile panel 22; or, extending and laying one (1) or both of the textile panels 22 upon a bed portion 105 of the truck 100 to provide protection of the bed 105 from damage caused by cargo 57 or abrasive materials; or, utilizing the textile panels 22 to cover a load of cargo 57 by extending both textile panels 22 inwardly; joining both adjacent extended edges using methods such as routing a length of cord 56 such as rope through grommets 24 located along the edge; pulling the textile panels 22 taut upon the cargo 57 by engaging the socket portion 62 of the windup tool 60 with the drive slot portion 27 of the spindle 26; grasping and rotating the handle portion 64 of the windup tool 60 to tighten the textile panels 22; and, allowing the ratchet 46 and pawl 47 portions to retain a tension upon the textile panels 22 to secure the cargo 57. It is understood that the apparatus 10 may be utilized to perform various additional tasks, and is not limited to the example applications described here, and as such should not be interpreted as a limiting factor of the invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A truck bed liner, comprising:
   a frame assembly capable of being removably attached to an interior side of a bed of a truck via at least a pair of brackets, further comprising:
      a planar portion, having a pair of distal ends each slidably engaging and securable to each of said pair of brackets;
      a pair of end plates, each perpendicularly extending away from said pair of brackets and located at said pair of distal ends; and,
      a spindle having a drive slot on a first end thereof, said spindle rotatingly attached to and spanning a distance between said pair of end plates; and,
   a textile panel having a proximal end mounted to said frame assembly and an opposing distal edge;
   wherein said spindle receives said proximal end of said textile panel;
   wherein said textile panel is disposed in a rolled configuration when not deployed; and,
   wherein said textile panel is selectively deployed to cover said bed of said truck or an exterior side of said bed of said truck.

2. The liner of claim 1, wherein said frame assembly further comprises:
   a ratchet gear attached to said first end of said spindle adjacent said drive slot; and,
   a pawl attached to one of said pair of end plates adjacent to said ratchet gear and in mechanical communication therewith;
   wherein said ratchet gear and said pawl provide for rotational control of said spindle; and,
   wherein said rotational control operates to permit or arrest deployment of said textile panel.

3. The liner of claim 1, wherein said frame assembly further comprises a windup tool capable of engaging said drive slot to selectively wind said textile panel about an axis of said spindle.

4. The liner of claim 1, wherein said frame assembly further comprises a windup tool capable of engaging said drive slot to selectively unwind said textile panel away from said axis of said spindle.

5. A truck bed liner, comprising:
   a frame assembly capable of being removably attached to an interior side of a bed of a truck via at least a pair of brackets, further comprising:
      a planar portion, having a pair of distal ends each slidably engaging and securable to each of said pair of brackets;
      a pair of end plates, each perpendicularly extending away from said pair of brackets and located at said pair of distal ends; and,
      a spindle having a drive slot on a first end thereof, said spindle rotatingly attached to and spanning a distance between said pair of end plates;
   a textile panel having a proximal end mounted to said frame assembly and an opposing distal edge; and,
   at least one pole, each capable of being inserted into said textile panel;
   wherein said spindle receives said proximal end of said textile panel;
   wherein said textile panel is disposed in a rolled configuration when not deployed; and,
   wherein said textile panel is selectively deployed to cover said bed of said truck or an exterior side of said bed of said truck.

6. The liner of claim 5, wherein said frame assembly further comprises:
   a ratchet gear attached to said first end of said spindle adjacent said drive slot; and,
   a pawl attached to one of said pair of end plates adjacent to said ratchet gear and in mechanical communication therewith;
   wherein said ratchet gear and said pawl provide for rotational control of said spindle; and,
   wherein said rotational control operates to permit or arrest deployment of said textile panel.

7. The liner of claim 5, wherein said frame assembly further comprises a windup tool capable of engaging said drive slot to selectively wind said textile panel about an axis of said spindle.

8. The liner of claim 5, wherein said frame assembly further comprises a windup tool capable of engaging said drive slot to selectively unwind said textile panel away from said axis of said spindle.

9. The liner of claim 5, wherein said distal edge of said textile panel further comprises at least a pair of grommets disposed adjacent to a perimeter thereof;
   wherein each said pole has a first end configured to be inserted into an individual grommet and a second end configured to be inserted into or onto a surface; and,
   wherein each said pole is configured to support said distal edge of said textile panel at an elevated position above said surface.

10. A truck bed liner, comprising:
   a first frame assembly capable of being removably attached to a first interior side of a bed of a truck via at least a first pair of brackets;
   a second frame assembly capable of being removably attached to a second interior side of a bed of a truck opposite said first interior side via at least a second pair of brackets;
   a first textile panel having a proximal end mounted to said first frame assembly and an opposing first distal edge;
   a second textile panel having a second proximal end mounted to said second frame assembly and an opposing second distal edge;
   a cord, capable of conjoining said first and second textile panels; and,
   at least one pole, each capable of being inserted into said first and second textile panel;
   wherein said first and second frame assemblies each further comprises:
      a planar portion, having a pair of distal ends each slidably engaging and securable to each of said respective first or second pair of brackets;

a pair of end plates, each perpendicularly extending away from said respective first or second pair of brackets and located at said pair of distal ends; and, a spindle having a drive slot on a first end thereof, said spindle rotatingly attached to and spanning a distance between said pair of end plates;

wherein said spindle is capable of receiving said first proximal end of said first textile panel or said second proximal end of said second textile panel;

wherein said first and second textile panels are disposed in a rolled configuration when not deployed;

wherein said first textile panel is selectively deployed to cover said bed of said truck or a first exterior side of said bed of said truck; and, wherein said second textile panel is selectively deployed to cover said bed of said truck or a second exterior side of said bed of said truck.

11. The liner of claim 10, wherein said first and second frame assemblies further comprise:

a ratchet gear attached to said first end of said spindle which is adjacent said drive slot; and, a pawl attached to one of said pair of end plates adjacent to said ratchet gear and in mechanical communication therewith;

wherein said ratchet gear and said pawl provide for rotational control of said spindle; and, wherein said rotational control operates to permit or arrest deployment of said first or second textile panel.

12. The liner of claim 10, wherein said first and second frame assembly further comprises a windup tool capable of engaging said drive slot to selectively wind said first or second textile panel about an axis of said spindle.

13. The liner of claim 10, wherein said first and second frame assembly further comprises a windup tool capable of engaging said drive slot to selectively unwind said first or second textile panel away from said axis of said spindle.

14. The liner of claim 10, wherein said first and second textile panel distal edge each further comprises at least a pair of grommets disposed adjacent to a perimeter thereof;

wherein each said pole has a first end configured to be inserted into an individual grommet and a second end configured to be inserted into or onto a surface;

wherein each said pole is configured to support said distal edge of said textile panel at an elevated position above said surface; and, wherein said cord is capable of being routed through grommets of said first textile panel distal edge and said second textile panel distal edge, when said first and second textile panels are deployed within said bed.

* * * * *